Sept. 23, 1969    R. L. MORRIS ET AL    3,468,267
MULCHING AND SEEDING APPARATUS Filed Aug. 2, 1966    4 Sheets-Sheet 1

INVENTORS
ROBERT L. MORRIS
JOHN F. KINNEY
BY
ATTORNEY

Sept. 23, 1969  R. L. MORRIS ET AL  3,468,267
MULCHING AND SEEDING APPARATUS
Filed Aug. 2, 1966  4 Sheets-Sheet 2

INVENTORS
ROBERT L. MORRIS
JOHN F. KINNEY
BY
ATTORNEY

INVENTORS
ROBERT L. MORRIS
JOHN F. KINNEY
BY
ATTORNEY

United States Patent Office 3,468,267
Patented Sept. 23, 1969

3,468,267
MULCHING AND SEEDING APPARATUS
Robert L. Morris, Decatur, and John F. Kinney, Atlanta, Ga., assignors, by mesne assignments, to Union Carbide Corporation, New York, N.Y., a corporation of New York
Filed Aug. 2, 1966, Ser. No. 569,609
Int. Cl. A01c 7/18, 5/00
U.S. Cl. 111—73                    24 Claims

ABSTRACT OF THE DISCLOSURE

A mulcher-seeding apparatus adapted to prepare a seed bed, to apply a plastic mulch film to the seed bed, to secure and anchor the mulch to the longitudinal edges of the seed bed, and to open the mulch film to permit insertion of seeds and seed covering material therethrough into the soil prior to or during the seeding operation.

---

This invention relates in general to an improved agricultural implement and, more specifically, the invention deals with a farm implement or attachment for laying mulch and planting seeds in one completely automatic and mechanized manner or operation.

It is well known that in order to produce early crop yields and accelerate growth of farm and garden produce and most row crops such as tomatoes, cucumbers, melons, squash, beans, peppers, strawberries, and the like, one must provide a suitable mulch, such as grey or black polyethylene plastic film (1 mil or 1.5 mil thickness) or the like over the rows of plants. These thin plastic film mulch covers tend to retain moisture in the soil or earth which is covered by the mulch and maintain a higher but uniform temperature in the soil beneath said mulch, eliminates cultivating which can destroy plant roots, aids in weed control and erosion control, preserves nutrients in the soil, etc., all of which factors contribute to early germination, accelerated plant growth, and early crop yields.

Heretofore, it has been a problem to plant seeds in the soil below such plastic mulch covers and accurately to provide for the growth of plants from the seeds upwardly through openings in such plastic mulch covers. Under the foregoing conditions, it has heretofore been necessary manually to plant seeds through such plastic mulch covers by first perforating the cover and piercing the soil, then subsequently dropping a seed in the cavity below the opening in the cover and then pouring a covering material over the seed to enclose it in the soil directly below the opening in the plastic mulch covers. Automatic planting and mulching means, such as the apparatus disclosed in United States Patent 3,161,163, have been successful in demonstrating the technique for automating these operations, particularly with respect to young plants or seedlings. However, such apparatus on occasion do not clearly pierce the mulch film being laid during the process of planting and also have a tendency to damage the plastic mulch and in general are not applicable to planting seeds.

Accordingly, it is the principal object of the invention to provide a mulching and seeding apparatus which will automatically lay mulch, automatically perforate same and pierce cavities in the soil therebelow while dispensing seeds and seed covering materials into the pierced cavities in the soil directly below the openings in the plastic mulch, all of said operations being done at substantially the same time and at seeding or planting rates reasonably comparable with conventional mechanical seeding methods in unmulched ground.

Another object of the invention is to provide an automatic seeder including a common seed dispensing means and a plurality of planting needle assemblies which are capable of seeding most row crops in mulched or unmulched ground.

Yet another object of the invention, in addition to each of the foregoing objects, is to provide an automatic mulching and seeding apparatus which includes means by which the opposite side, longitudinal edge portions of the mulch film being laid may be tautly seated in troughs formed by the apparatus and then covered up by means of soil removed to form the troughs.

A still further object of the invention is to provide an automatic mulch laying apparatus which can be operated individually and independent of the planting apparatus.

Yet still another object of the invention is to provide an apparatus which is so arranged and constituted that it is adjustable in width from thirty-six inches to sixty inches, thus being adaptable for use with mulch film of any standard width.

A still further object of the invention is to provide a ground driven rotary mechanism with a plurality of projecting seed planting needles and common cam means disposed in a fixed position relative to the rotary mechanism so as to automatically open said needles and dump seeds and covering materials into the soil when the needles are successively projected into the ground.

Yet another object of the invention, in addition to each and every one of the preceding objects, is to provide an automatic seeder and mulcher which will conform to conventional forms of manufacture, be efficient and convenient to operate, rugged in construction, flexible in use, and economically desirable and long lasting.

The present invention provides an apparatus which comprises, in combination, means to prepare a seed bed, means to apply a plastic mulch to the seed bed, means to secure and anchor the mulch to the longitudinal edges of the seed bed, and means for opening the mulch film to permit insertion of seeds and seed covering material therethrough into the soil prior to or during the seeding operation. Thus, the foregoing and other objects and advantages will become more apparent from a reading of the following specification, wherein the details of construction and operation of the apparatus of the invention are described and claimed, reference being had to the accompanying drawings forming a part hereof, wherein like numerals refer to like parts throughout, and in which:

Figure 1:
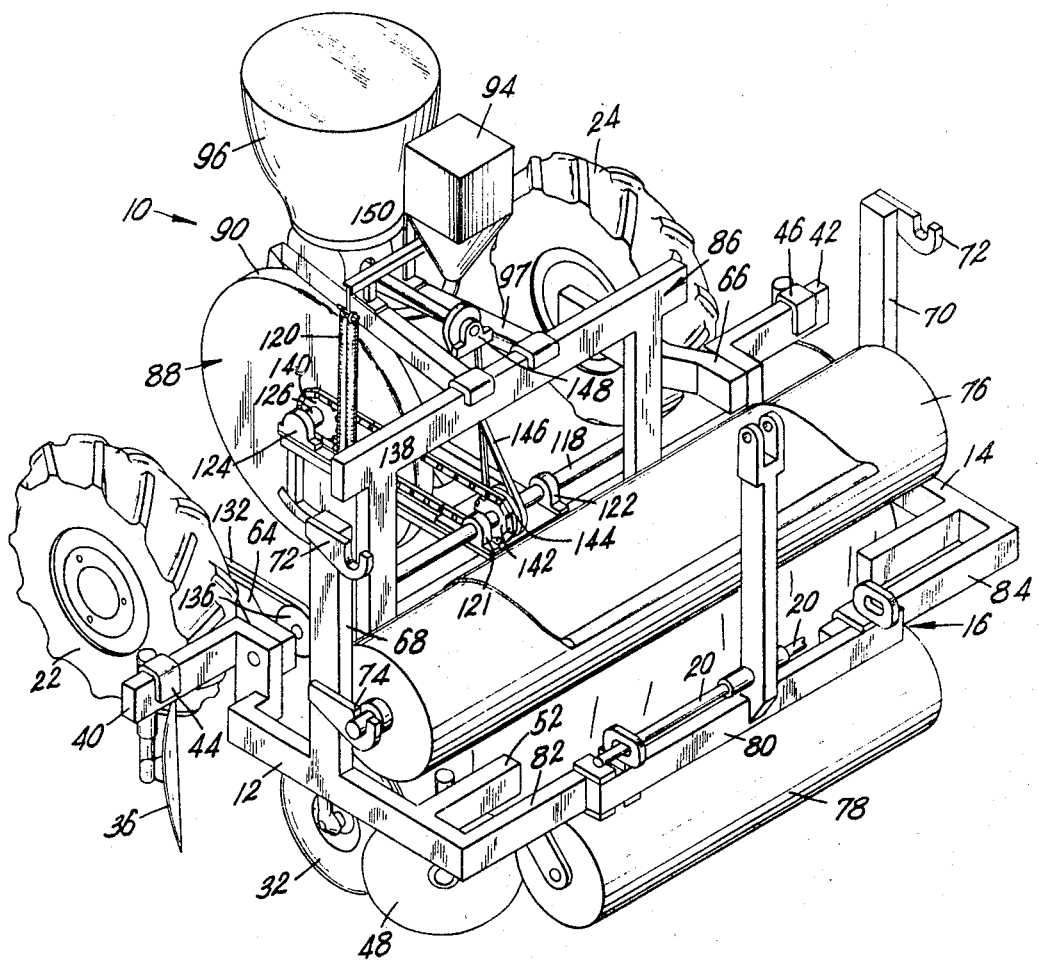
FIGURE 1 is a perspective view as seen from the front and above of an automatic seeder and mulcher apparatus embodying the teachings of the invention.
Figure 2:
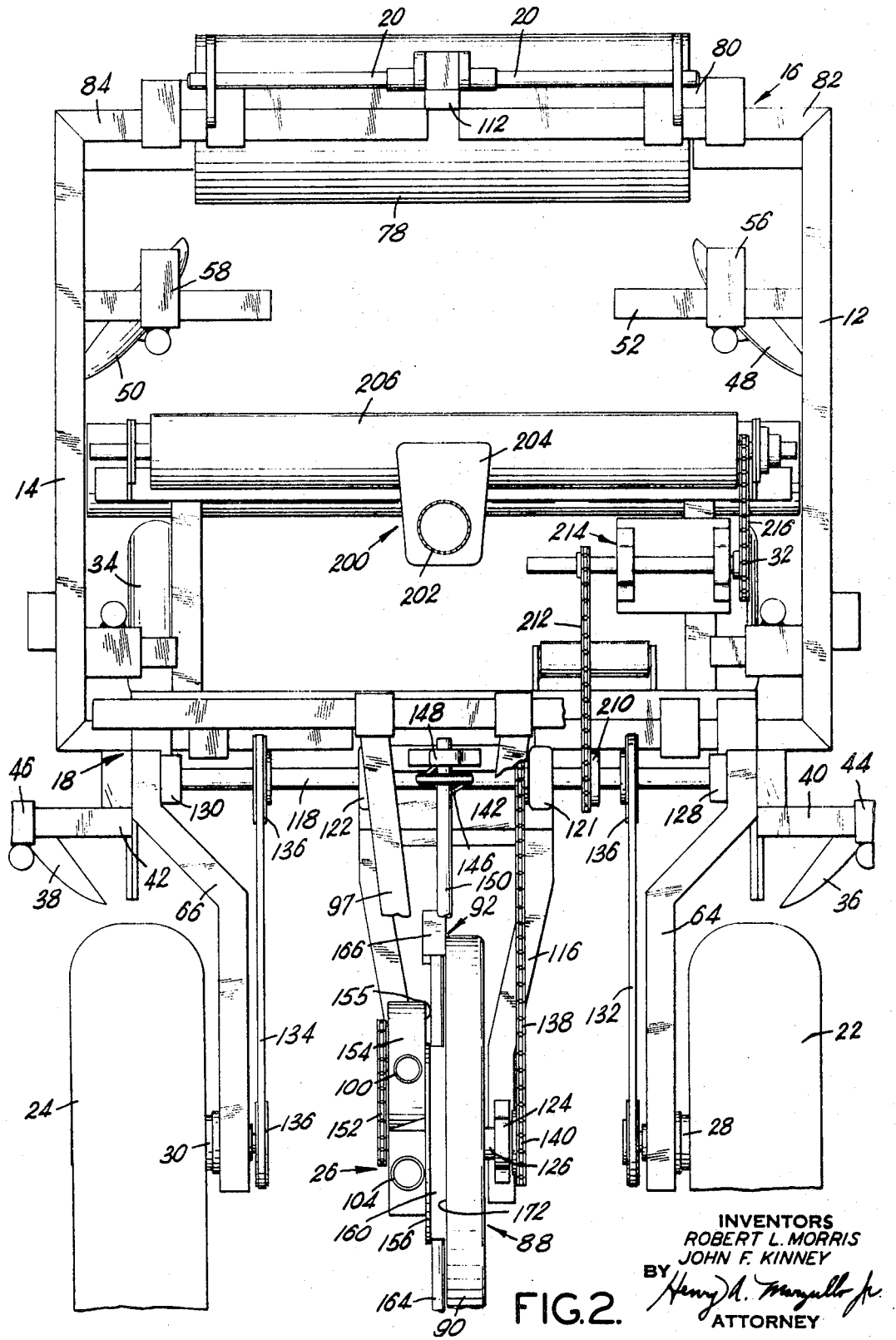
FIGURE 2 is a plan view of the apparatus shown in FIGURE 1, the rotary mechanism and rear traction wheels being partially shown.
Figure 3:
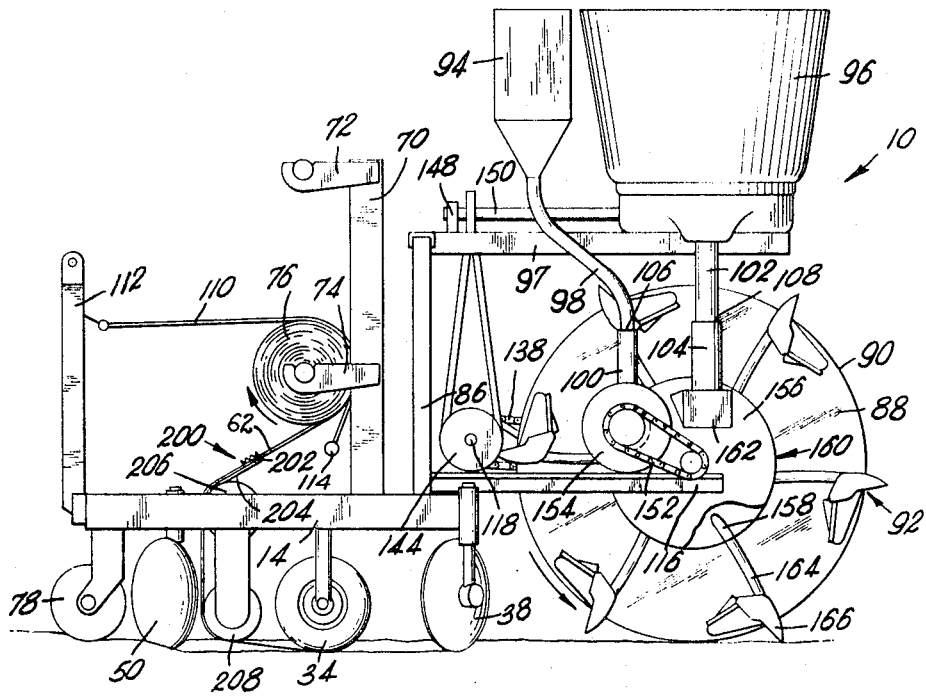
FIGURE 3 is a side elevational view of the apparatus shown in FIGURE 1.

Referring now to the drawing and as best shown in FIGURES 1, 2 and 3, there is shown the mulching and seeding apparatus 10 of the invention. The mulcher-seeder 10 comprises left and right hand major main framing bars or members 12 and 14 respectively, which are suitably secured to one another at their forward ends by means of a telescoping like cross bar assembly or member 16. The left and right hand main frame members 12 and 14 are also suitably secured to one another at their trailing ends or rearward ends by means of another suitable telescoping like cross bar assembly or member 18, and all of said members are suitably constructed of rectangular tubing so as to be lightweight and provide a very rigid and strong unitary like structure. The mulcher-seeder apparatus 10 may be drawn by any suitable power means, such as by animal means or preferably by a mechanized farm vehicle such as a tractor (not shown). The apparatus 10 is suitably provided with a conventional articulated 3-point hitching arrangement 20 so as to permit the mulcher-seeder to travel on a radius about the tractor steering pivot point as a trailer pulled by a single point hitch. Thus, the tendency for the apparatus to slew across the soil bed as the tractor steers is precluded and obviated.

A pair of suitable drive or traction wheels 22 and 24 are provided near the rear end of the apparatus 10 and adjacent the seed wheel means 26 so as to support some of the weight of the apparatus and to provide driving take-off means for the various driving parts of the apparatus 10 as will be described hereinafter in greater detail. The wheels 22 and 24 are suitably mounted for rotation upon their associated shafts or axles 28 and 30. Another pair of wheels 32 and 34, commonly known as press wheels, are suitably mounted to the left and right hand main framing members 12 and 14 respectively, and although they aid in supporting the weight of the entire apparatus 10, they are primarily engaged in holding the plastic mulch taut across the bed of soil until the longitudinal edges of the plastic mulch are covered with dirt or soil by means of the closing discs 36 and 38. These discs 36 and 38 are suitably adjustably secured to extensions 40 and 42 of the frame members 12 and 14 by means of extending clamp elements 44 and 46.

A similar pair of front plowing discs 48 and 50 are also adjustably supported from extensions 52 and 54 by means of suitable extending clamp elements 56 and 58. As best shown in FIGURE 3, these discs 48 and 50 are employed to generally form parallel troughs 60 (only one shown) in which is received the opposite longitudinal side edges of the mulch film 62. The discs 36 and 38, it is noted are set so as to utilize and throw the dirt removed by discs 48 and 50 to form troughs 60 back over the longitudinal opposite side edge portions of the film 62. The press wheels 32 and 34 are noted to be disposed between the discs 48 and 50 and 36 and 38, and are used to roll over and press the longitudinal edge portions of the film 62 into the troughs 60 in order to seat them prior to being covered by soil and dirt placed thereon by the closing discs 36 and 38.

The main frame and assembly also includes extensions 64 and 66 which support the traction wheels 22 and 24 and their respective axles 28 and 30. Also, vertical support means, such as elements 68 and 70, which suitably form an integral part of the frame, are provided with upper and lower sets of hangers 72 and 74 respectively which support a roll of plastic mulch 76 and a spare roll of same (not shown). A forward front roll arrangement comprising a ground roller 78 suitably supports a considerable portion of the apparatus 10 and performs a limited bed preparation by generally leveling and flattening most objectionable high spots in the plant rows. Roller 78 is suitably secured to the telescoping front cross bar 16 which is comprised of a central member 80 and side extensions 82 and 84.

Similar vertical support means 86 are provided near the rear portion of the apparatus 10 for supporting the necessary hoppers and the seed wheel 88. The seed wheel 88, as will be herinafter disclosed in greater detail, is adjusted in elevation and ground load so as to permit the apparatus 10 to respectively lay mulch without planting seeds, and when the apparatus is used for planting to counterbalance and reduce the effective weight of the seed wheel 88 as seen by the ground in order to preclude cutting of the plastic mulch by the rim 90 of the seed wheel 88 and to allow just enough force to properly penetrate the ground with the seed needle assemblies 92. Conventional steady flow-gravity type seed hopper means 94 and seed covering material hopper means 96 are suitably supported by means of a cantilevered member 97 fixedly secured to the vertical support means 86, as best shown in FIGURE 3. Suitable telescoping plastic tubular elements 98 and 100 and 102 and 104 respectively convey the seeds from the hopper means to the dispensing means 106. If desired, these tubular elements may be of bellows type construction, thus eliminating the need for the sliding joints 106 and 108 respectively between tubular elements 98 and 100 and 102 and 104.

A suitable brake means comprising a weighted canvas 110 is suspended from an upright member 112. The member 112 is secured to and extends from the front central member 80 and the function of such brake means is to provide tension in the plastic mulch film 62 as it passes through the roller system to the ground. In FIGURE 3, the direction of rotation of the plastic supply roll 76, and the seed wheel 88 are shown by the arrows. Of course, the rotation of the plastic supply roll may be reversed so that the brake canvas 110 can be mounted from the vertical support means 86 rather than the member 112. The canvas 112 is weighted and held against the roll of film 76 by bar 114 which is secured to the free end of the canvas 112.

The seed wheel 88, as best shown in FIGURES 1, 2, 3 and 4 is supported by means of a seed wheel yoke 116 pivotally mounted to the drive shaft 118. Resilient means, such as springs 120, which may be suitably disposed on both sides of the seed wheel 88 between the yoke 116 and essentially the member 97 permit just enough force to properly penetrate the ground with the seed needle assemblies 92. Thus, reducing the load of the seed wheel 88 on the ground, and employing a seed wheel 88 having a rather wide and slightly convex rim, contribute in minimizing damage to the mulch film. The seed wheel yoke 116 is conventionally secured to a pair of bearing blocks 121 and 122, and another similar bearing block 124 supports the seed wheel 88 about axle 126.

The drive shaft 118 is suitably disposed between and within a pair of end bearing blocks or housings 128 and 130 secured respectively to framing members 12 and 64, and 14 and 66; and is driven by suitable drive means, such as belts, chains, etc. 132 and 134. The drive shaft 118 and its bearing blocks may, if desired, be fixed to the support means 86. These drive means 132 and 134 are disposed about suitable pulleys or sprockets 136. The seed wheel 88 in turn is driven by means of another suitable drive, such as the chain 138 and sprockets 140 and 142. Other take-off driving means comprising pulleys 144, belt 146, bearing housing 148, and shaft 150 suitably provides the driving mechanism for the seed covering materials hopper 96. Chain drive means 152 driven from a suitable sprocket attached to axle 126 drives a generally conventional seed dispenser 154. All of such sprockets are suitably pinned in place on the drive shaft 118.

A more detailed description of the seed dispenser 154 will be found in United States Patent No. 3,236,199. Such typical seed devices have a front housing wall which is adjacent the inner rotatable seed pick-up disc. It is through this wall that the seeds are ejected or dispensed from the rotatable disc one at a time (the wall is shown at 155 in FIGURE 2 of the drawing). A suitable dispensing opening or outlet is located in this wall and said wall is disposed adjacent a fixed split seal plate 156. The split seal plate 156 is provided with an opening (not shown) which allows a seed to pass through such plate 156 on its way to individual distributor headers 158 in the rotating distributor housing 160, as best shown in FIGURES 2 and 3.

Seed covering materials, which are stored in hopper 96, may be vermiculite or any other equivalent material which may be employed to cover seeds and which may have non-caking advantages or which may include various seed nutrients or other useful materials, as desired. Since the seed covering materials hopper 96 is a steady flow feeding device driven from the main drive shaft 118, it pours its charge through telescoping tubes 102 and 104 and into a secondary chamber 162 where the charge is suitably guided into the individual distributor headers 158 of rotatable housing 160. In the embodiment shown, six seed needle assemblies 92 are employed so therefore only six individual headers 158 are utilized. Additional header openings can be suitably plugged up if they are not to be used or if, as in the present case, say only three needle assemblies 92 are desired, then the other three header openings must be plugged by a block of wood or by other suitable means. The headers 158, in turn, transmit the charge into the seed needle assemblies 92 by means of flexible and extensible conduits or tubes 164. It is noted that centrifugal force feeds the seed and seed covering material into the seed needle assemblies 92, thus eliminating high speed feeding problems. With such a system, high speed planting can be readily accomplished without difficulty of the feed mechanism.

The secondary chamber 162 is built so that the seed covering material deliverd to it is evenly distributed to the individual distributor headers in use, up to the maximum volume that fills the seed needle assemblies at full extension, i.e., where the length of needle protruding beyond the seed wheel rim 90 is at its maximum, as will be described in greater detail hereinafter. Accordingly, it will be appreciated that the output of the seed covering materials hopper 96 is provided with a suitable adjustment to cover the range of charge feeding desired. It should also be noted that there remains a space in the headers 158 received for insertion of the seed, and that the seed is placed into the outer periphery or outboard end of the header 158 so that it is started toward the planting needle ahead or in front of the seed covering material. It may be desirable to perforate the inboard or inner end of the headers (not shown) to allow air flow, thus precluding any intermittent slugging. Such action would improve and aid the delivery of the seed and seed covering material to the needle assemblies 92 by reducing motion resistance. For the convenience of maintenance, cleaning out old seeds, or adjustment, etc., the lower half of the split seal plate 156 covering the distributor housing 160 is removably fastened thereto. It should also be apparent that the seed dispenser is removably mounted so as to facilitate a plate charge which is usually required for various size seeds.

Figure 4:
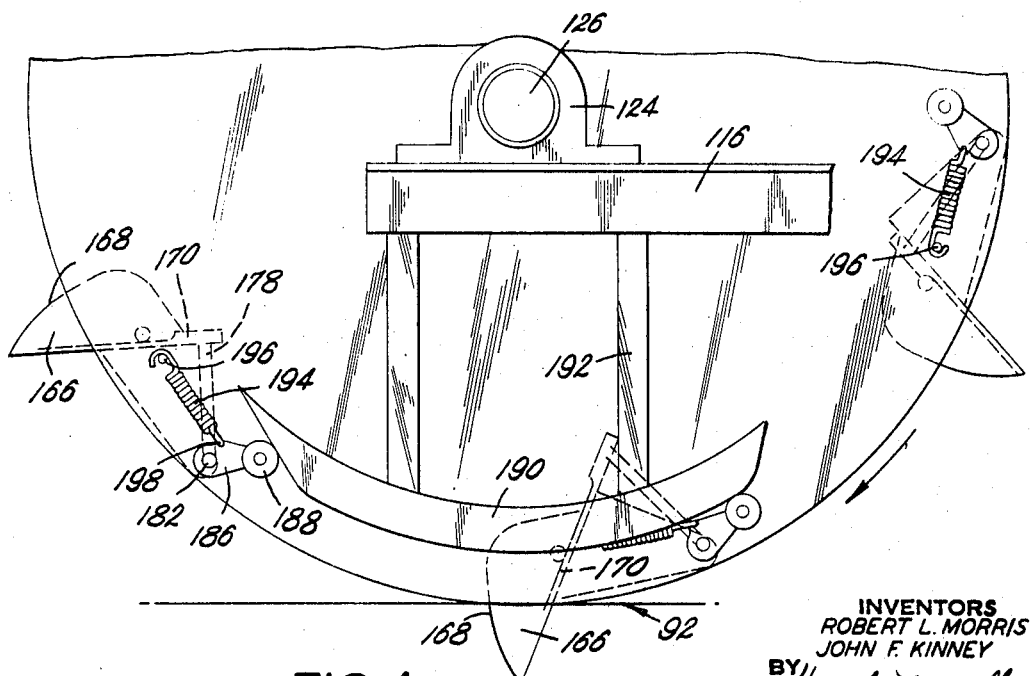
FIGURE 4 is an enlarged fragmentary view of the rotary mechanism or planter wheel showing in greater detail the cam side of such wheel and a seed needle in a piercing position.
Figure 5:
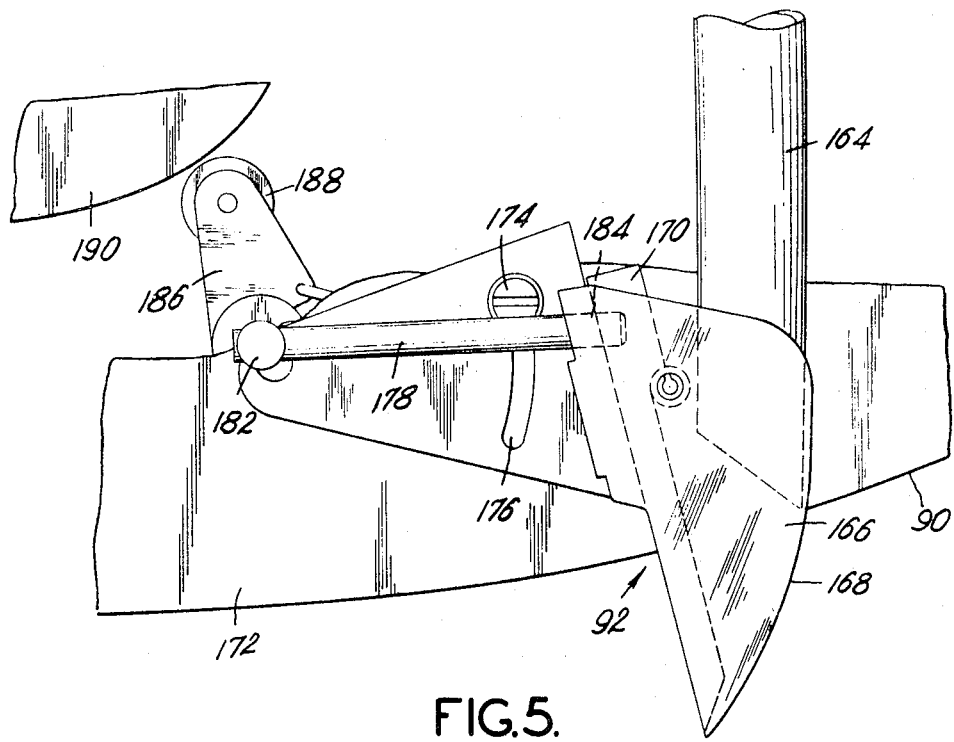
FIGURE 5 is a greatly enlarged fragmentary view of a typical seed needle assembly with its associated gate in the closed position.
Figure 6:
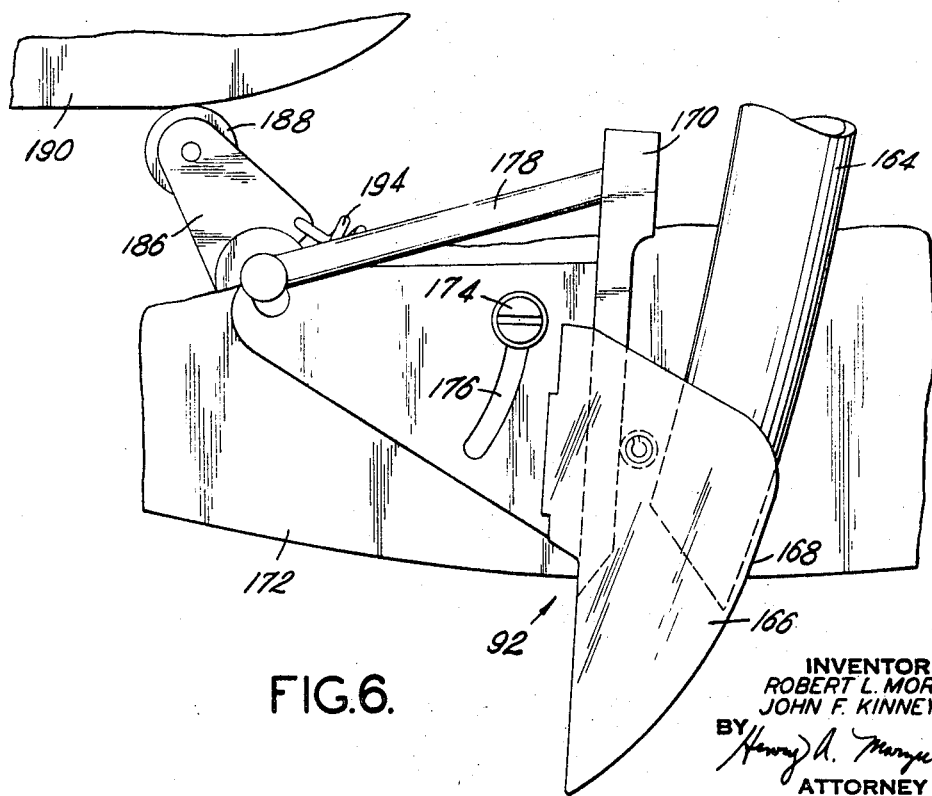
FIGURE 6 is another greatly enlarged fragmentary view of the same seed needle assembly shown in FIGURE 5, but only with its associated gate in an open and releasing position.

As best shown in FIGURES 4, 5 and 6, each seed needle assembly 92 comprises a needle body or housing 166 having an involute face 168 on one side and having a sliding gate 170 on the opposite side thereof. The needle housing 166 is attached to the flat side surface 172 of the seed wheel 88 by means of a suitable fastener such as the screw 174 in screw slot 176. By this arrangement, all necessary adjustments or settings of the needle depth (protrusion beyond the rim 90 of the seed wheel 88) can be readily made by loosening and retightening such screw 174. Pivoted rod like member 178 which activates (opens and closes) the sliding gate 170 is fixed at one end thereof 180 to pivot point 182. The free end 184 rides in a slot (not shown) in the sliding gate 170. Pivot point 182 which is rotatably secured to the surface 172 is fixed to the cam follower 186 and rotates a desired number of degrees when the roller 188 of the cam follower 186 makes contact with cam 190. The cam 190 is fixedly secured on the open side of the seed wheel 88 to the seed wheel yoke 116 by means of elements 192. Resilient means, comprising a follower extension spring 194, is anchored to the extended tip 196 of the screw 174 and to the cam follower 186 at point 198.

The internal operation of the above-described linkages allow same to function properly at all practical operating speeds without generating any unpredictable, outside bumps or bed or film damage. The sliding gates 170 all open satisfactorily regardless of land preparation or the up and down movement of the seed wheel 88 relative to the drive or traction wheels 22 and 24. It is important and critical to maintain the seed and seed cover materials system closed at all times so as to prevent wind and rain, etc. from affecting the feed systems. Thus, from the hoppers 94 and 96 which have removable tops to the seed needle assemblies 92, the flow systems are totally enclosed. Note that the sliding gates 170 are opened only when the needle assemblies 92 are close to bottom dead center. By this action, the needle assemblies dispense their charges behind in the punched ground apertures, while moving at zero relative horizontal velocity to the ground. The contour of the rear of each needle is such that a near involute of the rolling radius of the seed wheel is obtained which provides essentially zero lineal velocity in the horizontal plane at all times while in contact with the ground, minimizing discharge difficulties by avoiding any tendency to flip either vermiculite, etc. or dirt.

It is also noted that the invention permits adjusting the seed wheel 88 height relative to the traction wheels 22 and 24 so as to enable one machine to mulch and plant with seed beds of different heights. The adjustment is accomplished by maintaining the seed wheel 88 in a raised position off the ground. This can be readily done since the seed wheel 88 is pivotably mounted on the seed wheel yoke 116. In such cases, the hoppers 94 and 96 should also be emptied. Depth of a seed needle is easily changed by setting the slot 176 of housing 166 at another position with respect to the pivot point 182 which is also the pivot point of the housing 166. In this manner, the seed needle assemblies 92 may be completely backed-off so as not to protrude beyond the seed wheel rim 90 should such needle assemblies be unnecessary for a particular job. The seed needle assemblies 92 are sharp and they readily pierce the plastic mulch film 62 prior to depositing the seeds and seed covering materials.

However, it may be desirable to punch holes in the prelaid film by a suitable hole punching machine. Such machine can generally be attached in front of the seed wheel and the piercing of the ground by the seed needles must be indexed or synchronized with respect to the punched holes by suitable means, such as linkage or gearing means. In the embodiment shown herein (FIGURE 3), a simple punching flap 200 having a toothed cutter 202 and being attached by means of a cantilevered spring member 204 to a punch roll 206 readily punches the desired holes in the plastic film prior to laying same on the ground. Punching holes prior to needle insertion by piercing (without punching) completely removes the plastic from the hole and from subsequent contact with the delicate seedling as it begins to grow and come up through the ground. Roller 208 lays and positions the film 62 on the ground after it is unwrapped from the supply roll 76 and passes around the punch roll 206. As best shown in FIGURE 2, the punch roller 206 is driven at a desired speed from the drive shaft 118 by means of sprocket 210, chain 212, an intermediate gearing assembly 214, and chain 216 and its associated sprocket on the punch roll.

The apparatus of the invention is also capable of having a plurality of seed wheels 88 provided thereon. To attach or remove a seed wheel assembly 88 onto the apparatus 10 it is only necessary to insert the seed wheel yoke 116 over one end of the main drive shaft 118, place a hopper cantilevered member thereabove, and then engage the feed tubes and the resilient counterbalancing means. It should also be appreciated that the apparatus 10 may be equipped with a boom to facilitate loading the mulcher-seeder with large size supply rolls of film.

In operation, the mulcher-seeder 10 is suitably attached to a tractor or other like towing device by means of the three-point hitching arrangement and towed to a starting position at one end of a row to be either mulched, seeded or mulched and seeded together. The hoppers 94 and 96 have been filled respectively with seeds and granular seed covering material, such as vermiculite and a roll of mulch film 76 of a desired size has been loaded onto hangers 74. An initial length of mulch film 62 is generally reeled off the supply roll 76, passed around the punch roll 206, passed under the laying roller 208 and staked or otherwise affixed to the earth under and to the rear of the mulcher-seeder apparatus 10. The seed wheel 88 is suitably adjusted and set as described hereinbefore to ride atop the film 62 with a desired load and depth of needle penetration. The operator of the tractor engages the tractor gear shift and shifts from an off or neutral position to a forward drive. Thus, the mulcher-seeder starts to move with the tractor since it is being towed therebehind. Front discs 48 and 50 plow or furrow open the soil to form a pair of continuous and parallel side furrows spaced to accommodate the width of the mulch film 62. Mulch film 62 reels off supply roll 76 and passes over the punch roll 206 and under the laying roll 208, which presses the film into intimate contact with the earth bed prepared by the front ground roller 78. The lateral edges of the mulch film 62 are pressed firmly into the side furrows opened by said discs 48 and 50 by a pair of press wheels 32 and 34, which also serve to hold the film 62 in a taut condition while the closing discs 36 and 38 close the side furrows over the lateral edges of the mulch film 62, leaving the film edges embedded in the soil or earth.

Simultaneously with the above operations, rotational movement of the traction wheels 22 and 24 is transmitted through the drive shaft 118 to all the driven components. Thus, the punch roll 206 which is driven thereby proceeds to punch holes in the film 62, prior to its being laid on the ground, by means of the toothed cutter 202 which is attached to said roll.

For the soil piercing (or simultaneous film and soil piercing where film is not punched) operation, each of the seed needle assemblies are set to project beyond the perimeter or rim 90 of the seed wheel 88. It is the rearward and involute side 168 of each needle which is designed such that each needle rotates out of the soil after the soil has been pierced without disturbing the area around the pierced opening in the soil and without kicking up the seed or seed covering materials dispensed. As each seed needle assembly 92 pierces the soil and hits bottom dead center, the cam follower 186 is guided by the cam 190 to cause rod members 178 to kick open the sliding gate 170. Spring 194 returns the sliding gate 170 and the cam follower 186 respectively to their closed and normal "dwell" position. The seed or seeds, as noted hereinbefore, will enter the seed needle assemblies 92 and the pierced holes in the soil ahead of the seed covering materials.

Since many modifications will occur and could be made in the apparatus herein disclosed by those skilled in the art without departing from the spirit and scope of the invention, it is intended that all matter contained in the description and illustrated in the accompanying drawings shall be interpreted as being illustrative and not in a limiting sense.

What is claimed is:

1. In a mulch-seeder the combination of: a wheel-supported frame adapted for towing, furrow opener means mounted on said frame and adapted to open a pair of parallel side furrows, roller means secured to said frame and arranged so as to apply an elongated mulch film, having substantially parallel lateral edges, longitudinally on the soil over the side furrows, tamping wheel means attached to said frame and disposed to impress the lateral edges of said mulch film into said side furrows, side furrow closing means mounted on said frame and arranged to close the side furrows over the lateral edges of the mulch film, rotary seed planting means secured to a yoke pivotably mounted on said frame and arranged to be counterbalanced so as to limit the load exerted on said mulch film passing beneath said means; said seed planting means comprising at least one seed wheel having a plurality of soil piercing needle assemblies disposed on one side thereof and adjustably adapted for projecting from the peripheral portion of said seed wheel, cavity means in the seed needle assemblies adapted to be opened adjacent the ends thereof by a sliding gate disposed within each of said needle assemblies, stationary cam means fixedly disposed to said yoke adjacent the opposite side of said seed wheel for opening said seed needle assemblies when same pierce the soil and are substantially at bottom dead center whereby as the needles are projected through said mulch film and into the soil the seeds and seed covering materials in each of the cavities of said needle assemblies are deposited into the pierced openings in the soil, and resilient means for closing the sliding gate of said seed needle assemblies.

2. The combination of claim 1 wherein each seed needle assembly comprises a housing having a flat front sliding gate and a rear involute shaped portion; said involute surface portion rotating out of the soil after the soil has been pierced without substantially disturbing the area around the pierced opening in the soil thereby minimizing and precluding any tendency for said seed needle assemblies to kick and flick the seeds and seed covering materials from the pierced openings.

3. The combination of claim 2 wherein seed dispensing means are disposed atop said frame adjacent said seed wheel and arranged to automatically dispense seeds into said seed needle assemblies.

4. The combination of claim 3 wherein adjustable hollow tubular elements provide the passage means between each of said seed needle assemblies and said seed dispensing means.

5. The combination of claim 4 wherein a seed covering materials dispenser is secured to said frame and disposed adjacent to said seed dispensing means and is so constituted and arranged to automatically dispense seed covering materials into said seed needle assemblies behind the seed deposited in each of said needle assemblies.

6. The combination of claim 5 wherein adjustable hollow tubular elements provide the passage means between each of said seed needle assemblies and said seed covering materials dispenser.

7. The combination of claim 2 wherein means for perforating apertures are provided on said frame for forming apertures in said mulch film prior to laying said film down on the soil; said means and said seed wheel being indexed and synchronized with respect to each other so as to cause each of said seed needle assemblies to pierce the soil exposed by the apertures in said mulch film.

8. The combination of claim 7 wherein said means for perforating apertures comprises a roll punch journaled to said frame and having hole punching means attached thereto for punching a hole in said mulch film as said mulch film passes over said roll punch in partial wrapping engagement.

9. The combination of claim 8 wherein said hole punch means comprises a cantilevered element having a toothed cutter secured to the free end thereof.

10. The combination of claim 9 wherein said toothed cutter comprises a continuous knife like cutting edge defining a closed geometric figure when viewed in plan.

11. The combination of claim 10 wherein seed dispensing means are disposed atop said frame adjacent said seed wheel and arranged to automatically dispense seeds into said seed needle assemblies.

12. The combination of claim 11 wherein adjustable hollow tubular elements provide direct totally enclosed passage means between each of said seed needl assemblies and said seed needle dispensing means.

13. The combination of claim 12 wherein a seed covering materials dispenser is secured to said frame and disposed adjacent to said seed dispensing means and is so constituted and arranged to automatically dispense seed covering materials into said seed needle assemblies behind the seed deposited in each of said needle assemblies.

14. The combination of claim 13 wherein adjustable hollow tubular elements provide the passage means between each of said seed needle assemblies and said seed covering materials dispenser.

15. The combination of claim 14 wherein said seed wheel, said seed dispensing means, said seed covering materials dispenser, and said roll punch are all powered from a common drive shaft driven by driving means connecting the wheels of said wheel-supported frame and said drive shaft.

16. The combination of claim 15 wherein the ends of said frame comprise telescoping sections to vary the width of said apparatus depending upon the width of the mulch film employed and the number of seed wheels disposed thereon.

17. The combination of claim 16 wherein brake means are employed so as to provide tension in the mulch film and to prevent the mulch film from unravelling and unnecessarily unwinding from the roll of mulch film.

18. The combination of claim 17 wherein means are provided on said apparatus frame for a second reserve supply roll of mulch film.

19. The combination of claim 18 wherein a forward roll arrangement is provided on said frame of said apparatus for preparing the soil bed for planting rows of seeds.

20. The combination of claim 6 wherein a distributor housing is secured to said seed wheel on the same side as said seed needle assemblies; said distributor housing having an individual distributor header connected directly to each of said passage means of said seed needle assemblies, and said individual headers communicating directly with said seed dispensing means and said seed covering materials dispenser whereby seed covering materials are metered and dispensed into said passage means and said seed needle assemblies simultaneously with but behind the dispensed seeds.

21. A seed needle assembly adapted to be secured to a seed wheel of a seed planter comprising: a seed needle housing having substantially parallel side walls, a front sliding gate and a curved rear portion; said seed needle housing being adjustably secured to said seed wheel about a pivot point, the pivot point being rigidly secured to a cam follower and having an extending rod like member communicating with said sliding gate, and spring means between said cam follower and fastening means securing said seed needle to said seed wheel maintaining said sliding gate in a closed position except when said cam follower is activated by camming means for opening said sliding gate.

22. The seed needle assembly of claim 21 wherein said curved rear portion thereof comprises an involute portion which is adapted to rotate out of the soil after the soil has been pierced without substantially disturbing the area around the pierced opening in the soil.

23. A seed planter comprising a seed wheel in the form of a disc adapted for towing behind a towing device by means of a yoke, said seed wheel having equally spaced on one side thereof a plurality of soil piercing needle assemblies adapted for projecting beyond the peripheral portion of said seed wheel and being adapted to pierce the soil sequentially as said seed wheel rotates over said soil; stationary camming means secured to said yoke for opening said seed needle assemblies, each of said needle assemblies having a housing forming a cavity therein and comprising parallel side walls; a flat sliding gate and a curved rear portion; said seed needle housings being adjustably secured to said seed wheel about a pivot point and said pivot point being rigidly secured to a cam follower; said pivot point having an extending rod like member communicating with a slot in said sliding gate for opening and closing the cavity in said housing; and spring means, between said cam follower and fastening means securing said seed needle housing to said seed wheel, maintaining said sliding gate in a normally closed position.

24. The seed planter of claim 23 wherein said rear curved portion of said housing is in the shape of an involute.

References Cited

UNITED STATES PATENTS

| | | | |
|---|---|---|---|
| 431,288 | 7/1890 | Shanks | 111—90 |
| 2,625,122 | 1/1953 | Carelock | 111—3 |
| 3,176,635 | 4/1965 | Mabon | 47—9 X |
| 3,204,589 | 9/1965 | Blackhurst et al. | 47—9 X |
| 3,228,363 | 1/1966 | Gardner et al. | 111—85 X |
| 3,234,691 | 2/1966 | Cowell | 47—9 |
| 3,236,199 | 2/1966 | Gray et al. | 111—91 |
| 3,293,797 | 12/1966 | Kappelmann et al. | 47—9 |

FOREIGN PATENTS

| | | |
|---|---|---|
| 101,052 | 9/1925 | Austria. |

ANTONIO F. GUIDA, Primary Examiner

ALAN E. KOPECKI, Assistant Examiner.

U.S. Cl. X.R.

47—9; 111—89